US011394165B2

(12) United States Patent
Robicheau et al.

(10) Patent No.: US 11,394,165 B2
(45) Date of Patent: Jul. 19, 2022

(54) REPOSITIONABLE TOOL DIE

(71) Applicant: Hubbell Incorporated, Shelton, CT (US)

(72) Inventors: Richard E. Robicheau, Litchfield, NH (US); Adam W. Jones, Olive Branch, MS (US); Shane M. Hopps, Whitfield, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 249 days.

(21) Appl. No.: 16/023,245

(22) Filed: Jun. 29, 2018

(65) Prior Publication Data
US 2019/0006810 A1 Jan. 3, 2019

Related U.S. Application Data

(60) Provisional application No. 62/526,913, filed on Jun. 29, 2017.

(51) Int. Cl.
| | | |
|---|---|---|
| *H01R 43/058* | (2006.01) | |
| *H01R 43/042* | (2006.01) | |
| *B25B 27/02* | (2006.01) | |
| *B21J 9/06* | (2006.01) | |
| *B21J 7/18* | (2006.01) | |
| *F16L 13/14* | (2006.01) | |
| *B21D 39/04* | (2006.01) | |

(52) U.S. Cl.
CPC ......... *H01R 43/058* (2013.01); *B21D 39/046* (2013.01); *B21J 7/18* (2013.01); *B21J 9/06* (2013.01); *B25B 27/026* (2013.01); *F16L 13/141* (2013.01); *H01R 43/0428* (2013.01)

(58) Field of Classification Search
CPC .... B21D 39/04; B21D 39/046; B21D 39/048; F16L 13/14; F16L 13/141; F16L 13/146; F16L 2013/145; B25B 27/02; B25B 27/026; B25B 27/10; B21J 7/18; B21J 9/06
USPC .......... 29/237, 282, 283.5; 72/412, 413, 416
See application file for complete search history.

(56) References Cited

U.S. PATENT DOCUMENTS

| | | |
|---|---|---|
| 2,829,549 A | 4/1958 | Demler |
| 3,098,517 A | 7/1963 | Zell |
| 3,504,417 A | 4/1970 | Filia |
| 3,523,351 A | 8/1970 | Filia |
| 3,800,584 A | 4/1974 | Edwards, Sr. |
| 3,931,671 A | 1/1976 | Dittmann |
| 4,630,462 A | 12/1986 | Wiener |
| 4,926,685 A * | 5/1990 | Shannon, Sr. ....... H01R 43/042 29/751 |
| 4,974,314 A | 12/1990 | Nickerson |
| 4,991,289 A | 2/1991 | French |
| 5,421,186 A | 6/1995 | Lefavour |

(Continued)

FOREIGN PATENT DOCUMENTS

EP  0620057 A1 * 10/1994 ............ B25B 27/10

*Primary Examiner* — Shelley M Self
*Assistant Examiner* — Katie L. Parr
(74) *Attorney, Agent, or Firm* — Wissing Miller LLP

(57) ABSTRACT

Hydraulic crimp tools, working heads for hydraulic crimp tools and die sets for crimping wire connectors onto electrical conductor wires using such hydraulic crimp tools are provided. The die sets include identical dies that can be repositioned on the working head to mechanically secure wire connectors to an electrical conductor wire or a bundle of electrical conductor wires from different orientations.

24 Claims, 10 Drawing Sheets

(56) References Cited

U.S. PATENT DOCUMENTS

| | | | |
|---|---|---|---|
| 5,435,167 A | | 7/1995 | Holliday |
| 5,775,158 A | | 7/1998 | Hensley |
| 5,983,489 A | | 11/1999 | Jee |
| 6,101,862 A | | 8/2000 | Rzasa |
| 6,227,030 B1 | * | 5/2001 | Lefavour ........... H01R 43/0428 29/751 |
| 6,272,738 B1 | | 5/2001 | Lefavour |
| 6,768,059 B1 | | 7/2004 | Lefavour |
| 6,769,173 B2 | | 8/2004 | Chadbourne |
| 7,165,436 B2 | | 1/2007 | Bitz |
| 7,493,791 B2 | * | 2/2009 | Chadbourne ........ H01R 43/058 72/409.19 |
| 7,628,052 B2 | * | 12/2009 | Zhang ................... B25B 27/146 72/409.16 |
| 7,762,117 B2 | | 7/2010 | Faucher |
| 8,001,822 B2 | | 8/2011 | Chadbourne |
| 8,418,520 B2 | * | 4/2013 | Stucki ..................... B25B 27/10 72/416 |
| 8,578,751 B2 | * | 11/2013 | Hofmann ................ B25B 27/10 29/751 |
| 9,166,353 B1 | * | 10/2015 | Doornbos ............ H01R 43/048 |
| 9,444,211 B2 | * | 9/2016 | Tsai ..................... H01R 43/042 |
| 9,543,727 B2 | | 1/2017 | Taylor |
| 10,981,264 B2 | * | 4/2021 | Koski ..................... B23P 19/04 |
| 2009/0255319 A1 | | 10/2009 | Sokol |
| 2010/0319191 A1 | | 12/2010 | Hofmann |
| 2015/0236464 A1 | * | 8/2015 | Rzasa .................. H01R 43/058 29/753 |
| 2016/0218474 A1 | * | 7/2016 | Tsai ....................... B21D 37/14 |
| 2017/0063014 A1 | * | 3/2017 | Rzasa ..................... B25B 27/10 |

* cited by examiner

REPOSITIONABLE TOOL DIE

CROSS REFERENCE TO RELATED APPLICATIONS

The present disclosure is based on and claims benefit from co-pending U.S. Provisional Patent Application Ser. No. 62/526,913, filed Jun. 29, 2017 entitled "Repositionable Tool Dies" the entire contents of which are incorporated herein by reference.

BACKGROUND

Field

The present disclosure is related to hydraulic crimp tools, working heads for hydraulic crimp tools and to dies for crimping wire connectors onto electrical conductor wires using such hydraulic crimping tools. More particularly, the present disclosure is related to working heads for hydraulic crimping tools having repositionable crimp dies for mechanically securing wire connectors to an electrical conductor wire or a bundle of electrical conductor wires.

Description of the Related Art

Crimp tools, often hydraulically and/or electrically driven, are known and are generally used to mechanically secure a connector to electrical conductor wires via compression or deformation (hereinafter "crimp" or "crimping") the electrical connector onto the conductor wires. Crimping tools typically have a working head with a stationary crimp die on one side of the working head and a movable crimp die on an opposite side of the working head. The movable crimp die is operatively connected to a movable ram or piston that moves between a normal position and a crimping position. In use, conductor wires are placed into an electrical connector and the combination is placed in the working head between the two crimp dies. The movable ram is then actuated to move the ram from the normal position to the crimping position so as to compress the electrical connector between the dies and crimp the electrical connector onto the conductor wires. Crimp die sets can impart a circular crimp onto the electrical connector to deform the connector around its circumference, or the crimp die sets can impart an indent crimp to deform the electrical connector in a central location of one side of the electrical connector.

Die sets are typically configured to be mounted to the working head in a fixed orientation in order to impart the desired crimp. Thus, if a particular crimping operation warranted that the die set be rotated, a new die set would have to be mounted to the working head taking time and increasing the number of die sets a technician needs in order to perform the various crimps a particular job may require.

SUMMARY

The present disclosure provides embodiments of hydraulic crimp tools, working heads for hydraulic crimp tools and die sets for crimping wire connectors onto electrical conductor wires using such hydraulic crimping tools are provided. The die sets include identical dies that can be repositioned on the working head to mechanically securing wire connectors to an electrical conductor wire or a bundle of electrical conductor wires from different orientations.

In an exemplary embodiment, a hydraulic crimp tool includes a tool driver and a working head. The working head is releasably coupled to the tool driver and includes a die set with die that can be repositioned within the working head to make crimps in different orientations. Each die in the die set includes a front face, a rear face and a plurality of side walls. The front face has an impacting surface that is used to crimp wire connectors. In an exemplary embodiment, the impacting surface is a semi-circular surface. The front face may also include at least one lip adjacent to the impacting surface. The at least one lip acts as a stop to limit the force applied when making a crimp. The rear face has a coupling member extending therefrom that is used to couple the die to a die mount. The coupling member may be a cylindrical member having an annular groove forming a detent configured to mate with a ball in the die mount to releasably couple the die to the die mount. The plurality of side walls separates the front surface from the rear surface. The plurality of side walls includes a first side wall having a flat front portion adjacent the front surface and a shaped rear portion adjacent the rear face. The plurality of side walls includes a second side wall that includes a flat front portion adjacent the front face and a shaped rear portion adjacent the rear face. The first side wall may be adjacent the second side wall.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides exemplary embodiments of hydraulic crimp tools, and to working heads for hydraulic crimp tools. The working heads have repositionable crimp die sets used to mechanically secure wire connectors to one or more electrical conductors. Non-limiting examples of the one or more electrical conductors include a single electrical conductor wire, a bundle of electrical conductor wires, a buss, laminated strips of conductors, any combination thereof or any other electrical conductor. Wire connector or connectors are used herein to broadly reference any type of device where one or more electrical conductors can be connected. Non-limiting examples of wire connectors include all families of taps, terminals and splices. For ease of description, the hydraulic crimp tools may also be referred to as the "tool" in the singular and as the "tools" in the plural. For ease of description, the repositionable crimp die sets may also be referred to as the "die set" in the singular and as the "die sets" in the plural.

Figure 1:
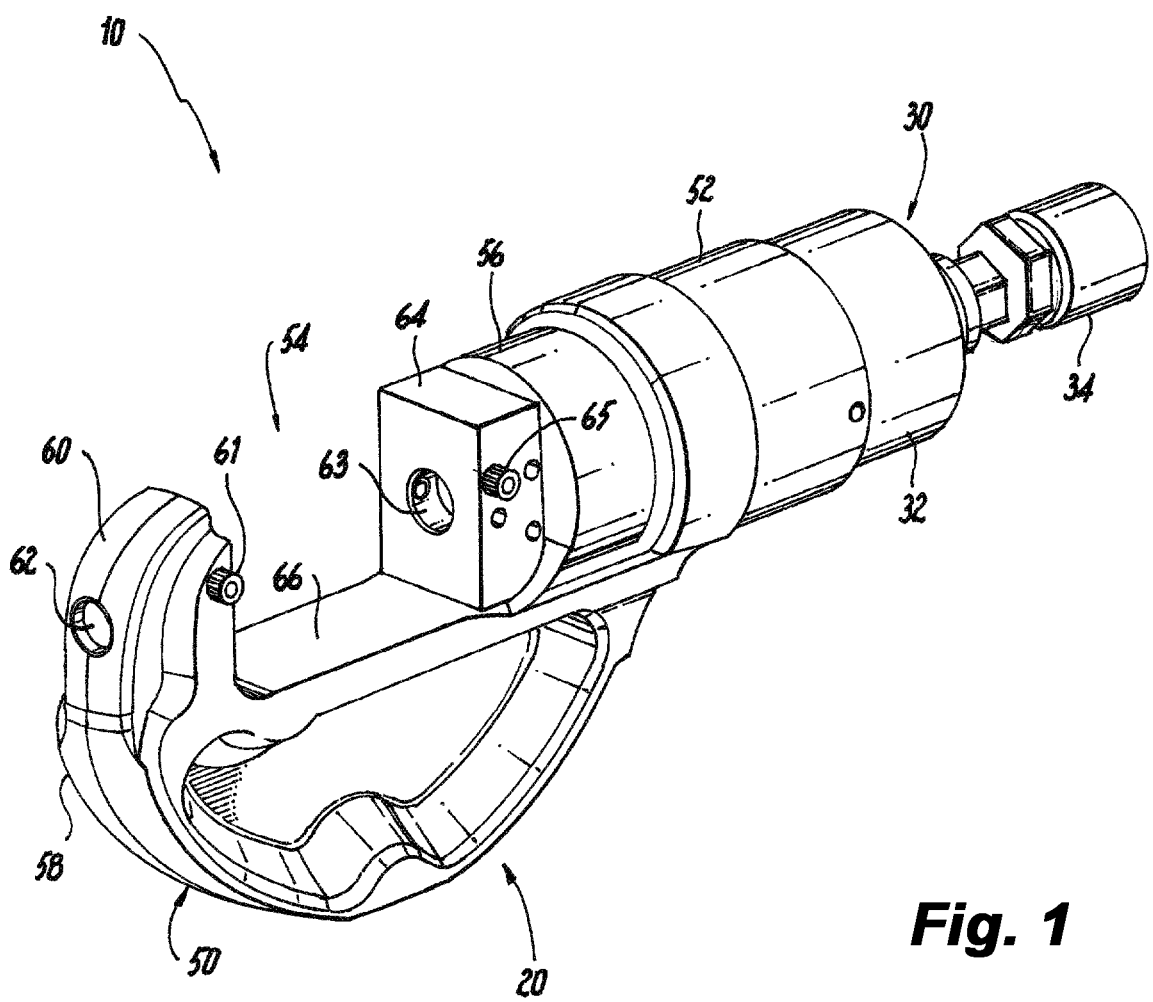
FIG. 1 is a perspective view of an exemplary embodiment of a hydraulic crimp tool according to the present disclosure, illustrating a working head portion and a tool driver portion of the tool.
Figure 2:
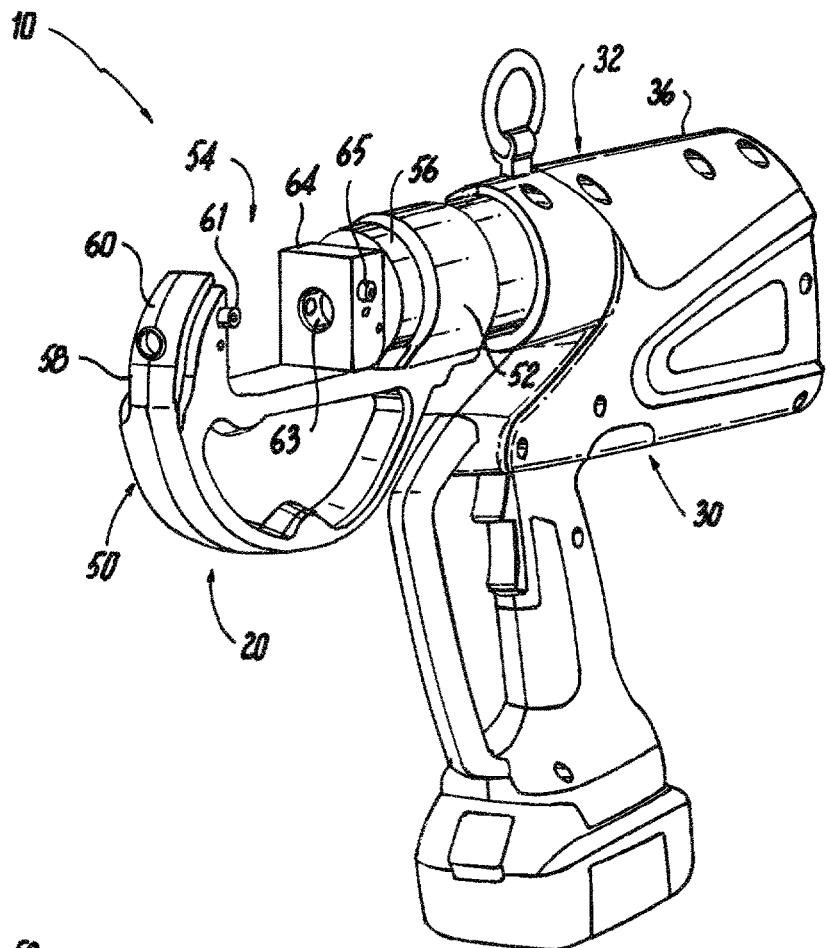
FIG. 2 is a front perspective view of another exemplary embodiment of a hydraulic crimp tool according to the present disclosure, illustrating a working head portion and a tool driver portion of the tool.
Figure 3:
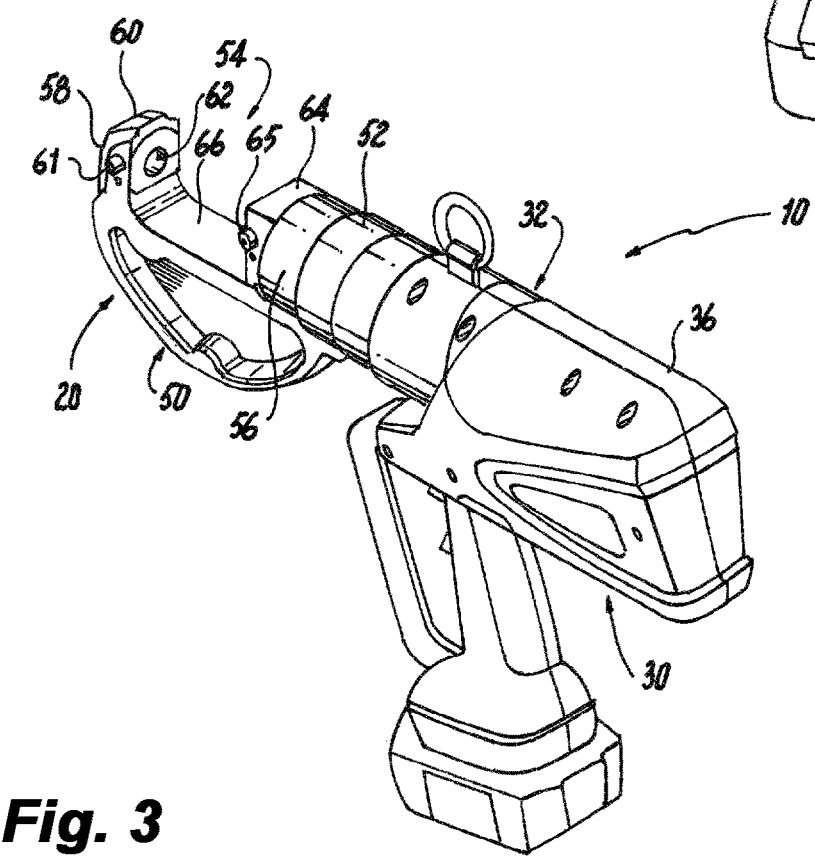
FIG. 3 is a rear perspective view of the hydraulic crimp tool of FIG. 2.

Referring to the drawings and in particular to FIGS. 1-3, exemplary embodiments of a tool according to the present disclosure are shown. The tool 10 can be any hydraulic crimp tool. Non-limiting examples of the tool include the commercially available Burndy Y750BHK remote hydraulic crimp tool shown partially in FIG. 1, the Burndy Y45 remote power operated hydraulic tool (not shown), and the Burndy PAT750K series tool shown in FIGS. 2 and 3. The tool 10 includes a working head portion 20 that is releasably coupled to a tool driver portion 30. For ease of description, the working head portion 20 may also be referred to herein as the "working head" and the tool driver portion 30 may also be referred to herein as the "tool driver."

In the exemplary embodiment of FIG. 1, the tool 10 is a remote hydraulic crimp tool where the working head 20 and a portion of the tool driver 30, including an adapter 32, are typically mounted to a bench (not shown) or other support structure, and the remaining portion of the tool driver 30 including a hydraulic pump (not shown) are remote from the working head. Typically, the adapter 32 is connected to the hydraulic pump via a high pressure hydraulic fluid hose 34. The adapter 32 has a piston or ram that is operatively connected to the working head 20. In the exemplary embodiment of FIG. 2, the tool 10 is a portable hand-held tool, and the tool driver 30 includes tool frame 36 with an internal motor, hydraulic pump and control system that drives a piston in adapter 32 that is operatively connected to the working head 20.

Figure 4:
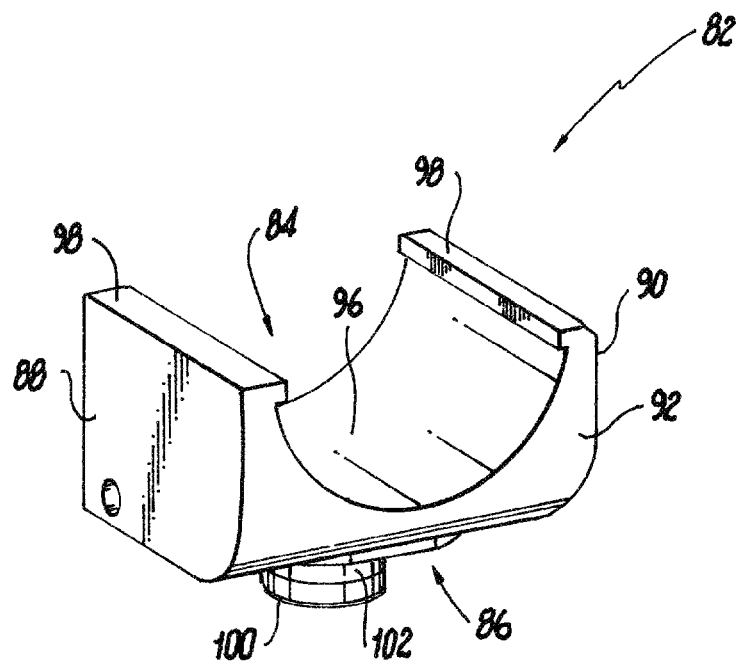
FIG. 4 is a front perspective view of an exemplary embodiment of a repositionable die according to the present disclosure.
Figure 12:
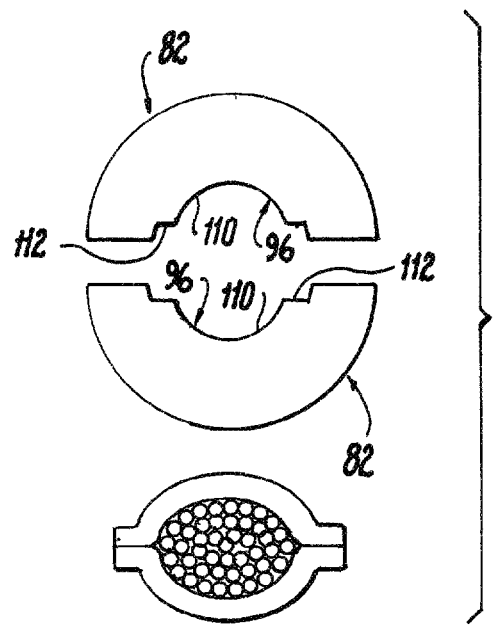
FIG. 12 is another exemplary embodiment of a repositionable die according to the present disclosure, illustrating a circumferential type impacting surface.

The working head 20 includes a head frame 50 and a die set 80 seen in FIG. 12. The head frame 50 includes a flange 52 that is used to connect the working head 20 to the adapter 32 of the tool driver 30. The head frame 50 may be releasably coupled to the adapter 32 in a fixed or locked in position, or the head frame 50 may be rotatably connected to the adapter 32. The head frame 50 of the working head 20 also includes a working area 54 defined by a proximal end 56 and a distal end 58. In this exemplary embodiment, the distal end 58 also forms a first die mount 60. In the exemplary embodiments shown, the first die mount 60 includes an orifice 62 in which a coupling member 100 of a die 82, seen in FIG. 4, can be inserted to engage, for example, known ball-and-detent systems and/or known set-screw systems to releasably secure the die 82 to the first die mount 60. A release button 61 extending from the first die mount 60 can be used to decouple the die 82 from the first die mount 60.

Adjacent the proximal end 56 of the working area 54 is a second die mount 64. The second die mount 64 is releasably coupled to a piston (not shown) within the adapter 32 as is known. The piston may be coupled to the second die mount 64 using, for example, known ball-and-detent systems and/or known set-screw systems. In another embodiment, the distal end of the piston may include, for example, a radial channel that is used to engage pins passed through the second die mount 64 to releasably secure the second die mount 64 to the piston, and to permit the piston to rotate independent of the second die mount 64 so that rotation of the piston is not translated to rotation of the die mount 64. In another embodiment, the distal end of the piston may include, for example, a slot on each side of the piston used to engage pins passed through the second die mount 64 to releasably secure the second die mount 64 to the piston. As shown in FIGS. 1-3, the second die mount 64 is at an at rest position where it is adjacent the proximal end 56 of the working area 54. When the tool 10 is activated the second die mount 64 moves toward a crimping position where the second die mount 64 is closer to the distal end 58 of the working area 54 so that the dies impact a wire connector in the working area 54 of the head frame 50. In the exemplary embodiments shown in FIGS. 1-3, the second die mount 64 includes an orifice 63 in which a coupling member 100 of a die 82, seen in FIG. 4, can be inserted to engage, for example, known ball-and-detent systems and/or known set-screw systems to releasably secure the die 82 to the second die mount 64. A release button 65 extending from the second die mount 64 can be used to decouple the die 82 from the second die mount 64. Between the proximal end 56 of the working area 54 and the first die mount 60 of the head frame 50 is a guide track 66 that guides a die 82 releasably coupled to the second die mount 64 as the second die mount 64 moves towards the crimping position.

Figure 13:
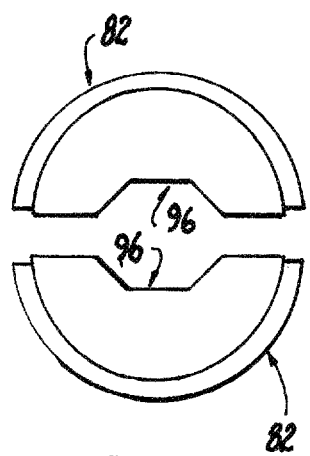
FIG. 13 is another exemplary embodiment of a repositionable die according to the present disclosure, illustrating a hexagon type impacting surface.
Figure 14:
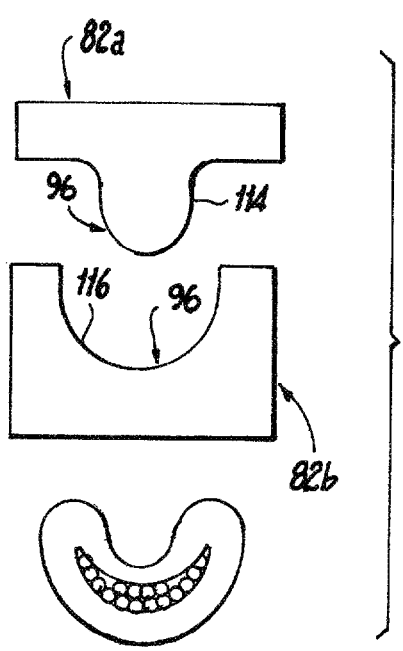
FIG. 14 is another exemplary embodiment of a repositionable die according to the present disclosure, illustrating a nest and indentor type impacting surfaces where one die would have a nest impacting surface and the other die would have an indentor impacting surface.

Referring now to FIGS. 4-11, exemplary embodiments of a die in the die set according to the present disclosure are shown. Each die set 80, seen in FIG. 12, includes first and second dies 82. The first and second dies 82 are the same so that they are interchangeable. Each die 82 includes a front face 84 and a rear face 86 separated by side walls 88, 90, 92 and 94. The front face 84 has an impacting surface 96 and one or more lips 98. The impacting surface 96 is configured and dimensioned to impact a wire connector (not shown) and impart a desired crimp shape onto the wire connector. In this exemplary embodiment, the impacting surface 96 is a semi-circular surface. Each lip 98 on each end of the semi-circular impacting surface 96. The lips 98 are provided to act as a stop to limit the crimping force applied when the dies 82 are in the crimping position. In another exemplary embodiment shown in FIG. 12, the impacting surface 96 may be a circumferential type impacting surface where each die 82 has a semi-circular portion 110 and notched portion 112 on each side that pinch the ends of the wire connector as shown. In another exemplary embodiment shown in FIG. 13, the impacting surface 96 may be a hexagon type impacting surface where each die 82 has a shape that forms three sides of a hexagon such that when a wire connector (not shown) is crimped the resulting shape of the crimp is a hexagon as shown. In another exemplary embodiment shown in FIG. 14, the impacting surface 96 of each die is different in that one die 82a has an impacting surface 96 that is shaped with an indentor 114 and the other die 82b has an impacting surface 96 that is shaped with a nest 116 that receives the indentor 114 such that when a wire connector is crimped the resulting shape of the crimp is a U-shape as shown.

Figure 5:
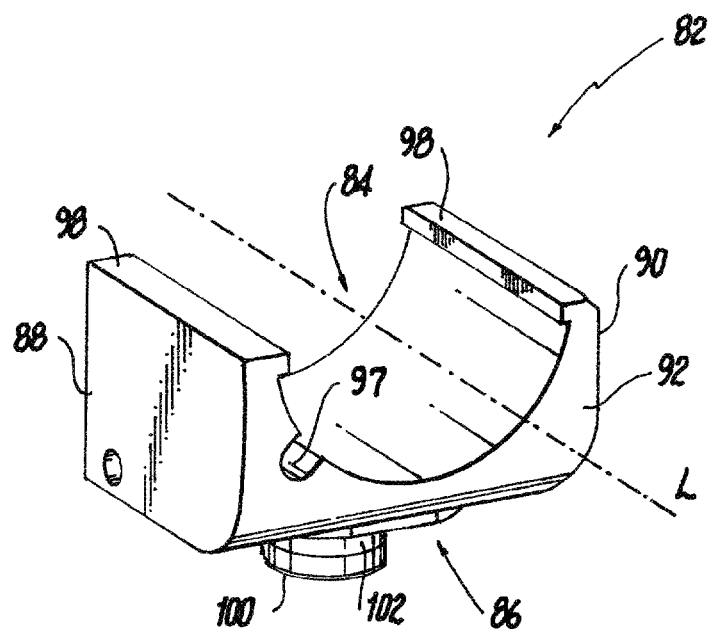
FIG. 5 is a front perspective view of another exemplary embodiment of a repositionable die according to the present disclosure.

In the exemplary embodiment of FIG. 5, the front face 84 may also include a partial groove 97 that extends partially along the impacting surface 96. The groove 97 may be provided so that a release pin used to release the die 82 from a die mount 60, as is known.

Figure 6:
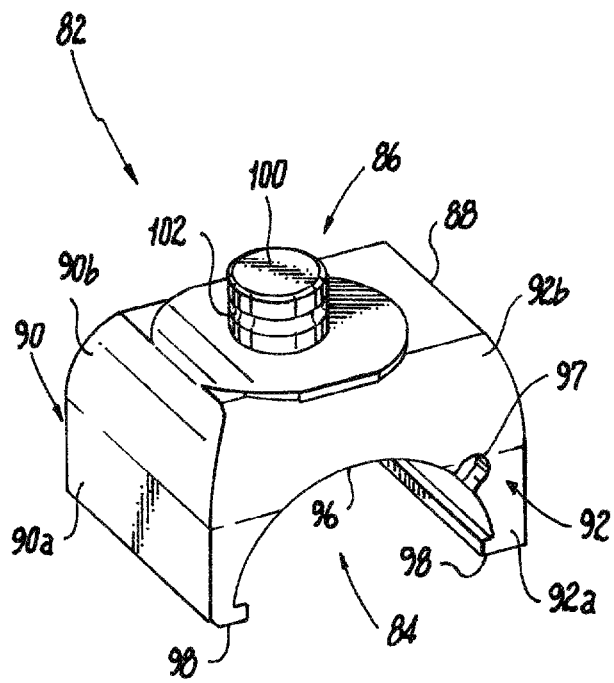
FIG. 6 is a rear perspective view of the repositionable die of FIG. 5.
Figure 7:
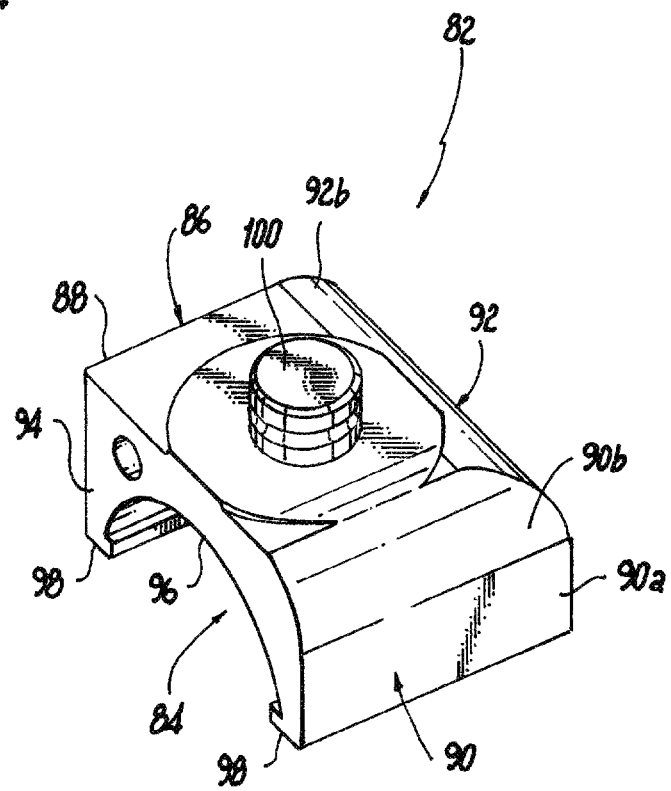
FIG. 7 is another rear perspective view of the repositionable die of FIG. 5.
Figure 8:
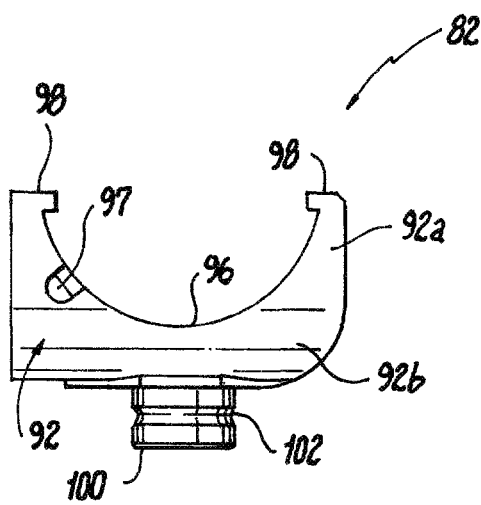
FIG. 8 is a first side elevation view of the repositionable die of FIG. 5.
Figure 9:
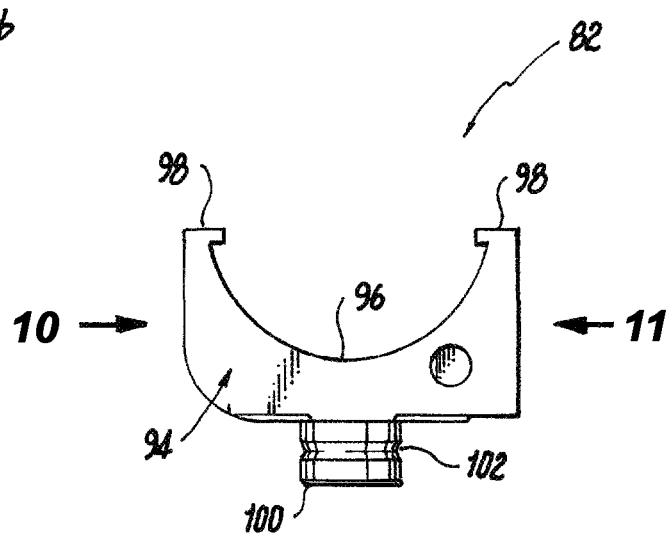
FIG. 9 is a second side elevation view of the repositionable die of FIG. 5.
Figure 10:
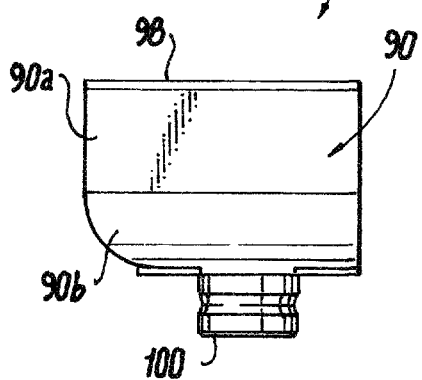
FIG. 10 is a third side elevation view of the repositionable die of FIG. 9 taken from side 10-10.
Figure 11:
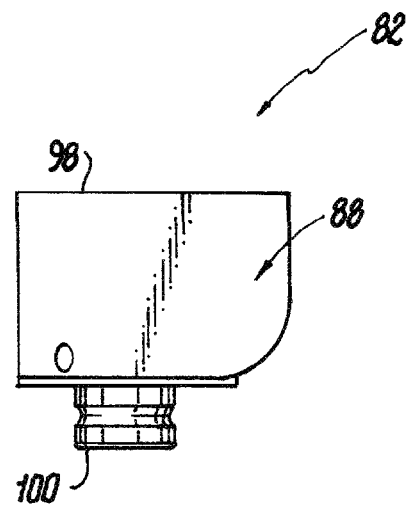
FIG. 11 is a fourth side elevation view of the repositionable die of FIG. 9 taken from side 11-11.

Referring to FIGS. 6 and 7, the rear face 86 of the die 82 has a coupling member 100. The coupling member 100 is used to releasably couple the die 82 to a die mount 60 or 64 of the working head 20. In this exemplary embodiment, the coupling member 100 is a cylindrical member having an annular groove 102 used to releasably couple the die 82 to the die mount 60 or 64. For example, the coupling member 100 and annular groove 102 allow the die 82 to be secured to the die mount 60 or 64 via known ball-and-detent systems and/or known set-screw systems. The present disclosure also contemplates that the dies 82 can be releasably coupled to die mounts 60 and 64 in any other known manner.

Figure 15:
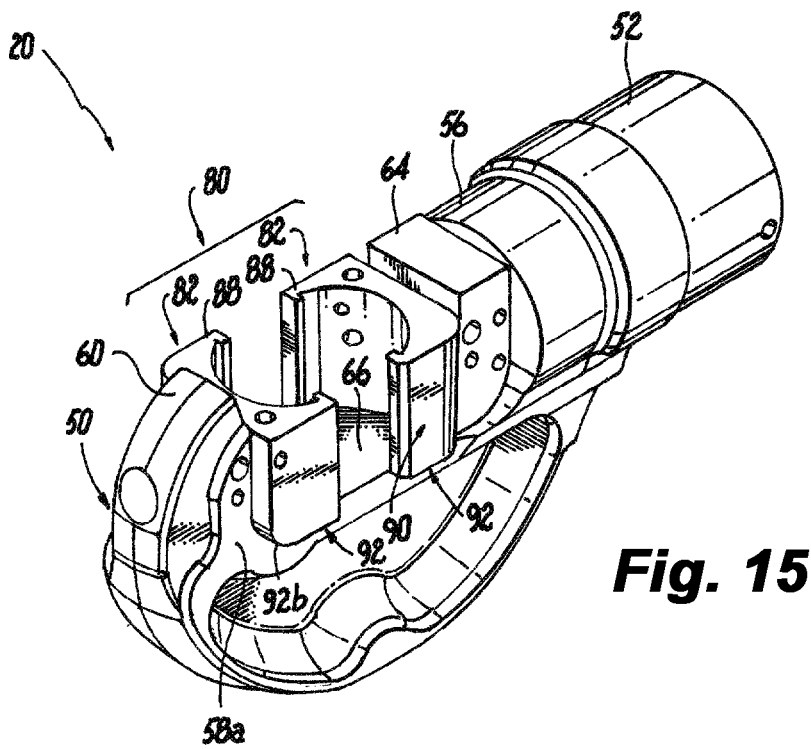
FIG. 15 is a top perspective view of an exemplary embodiment of a working head of a hydraulic crimp tool illustrating an exemplary embodiment of a die set according to the present disclosure releasably coupled to the working head in a first crimping orientation.
Figure 16:
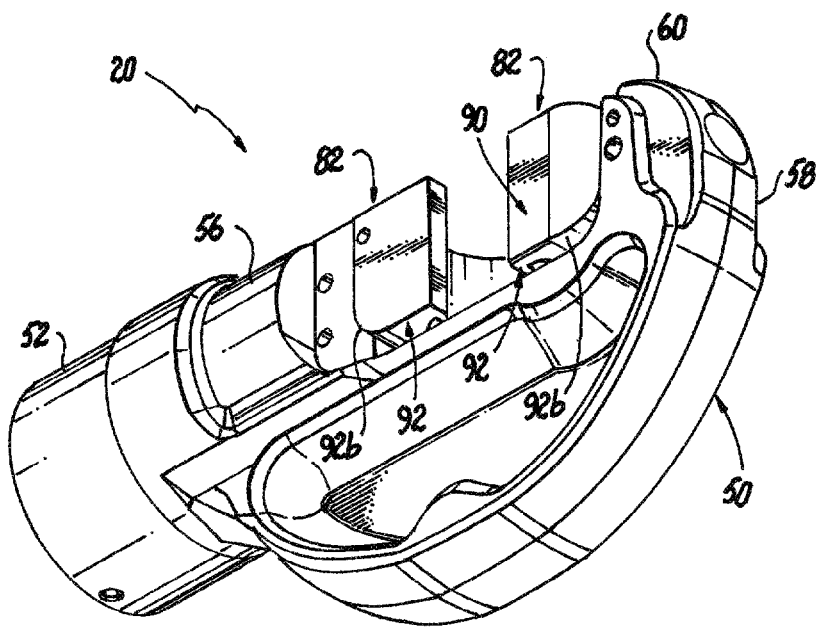
FIG. 16 is a bottom perspective view of the working head and die set of FIG. 15.

Referring to FIGS. 8-11, the side walls 88 (FIG. 11) and 94 (FIG. 9) are substantially flat walls as shown. The side wall 90, seen in FIG. 10, has a substantially flat front portion 90a and a shaped rear portion 90b. Similarly, the side wall 92, seen in FIG. 8, has a substantially flat front portion 92a and a shaped rear portion 92b. The shaped rear portion 90b of side wall 90 and the shaped rear portion 92b of side wall 92 are shaped to conform to the shape of edge 58a, seen in FIG. 15, of the distal end 58 of the working area 54, as described below. In the exemplary embodiment shown, the shaped edge 58a of the distal end 58 is a rounded edge and the shaped rear portions 90b and 92b are rounded shapes that conform to the rounded shaped edge 58a. While the shaped rear portions 92b and shaped edge 58a are shown as rounded surfaces, the present disclosure contemplates other shapes for the shaped rear portions 90b and 92b and the shaped edge 58a, such as chamfered, squared, or any other shape that allows for rotational alignment of the die 82. By shaping the rear walls 90b and 92b to conform to the shaped edge 58a of the of the distal end 58 of the working area 54 the die 82 is capable of being repositioned within the die mount 60 by for example rotating the die 82 by 90-degrees instead of requiring the purchase of a different die set.

Figure 17:
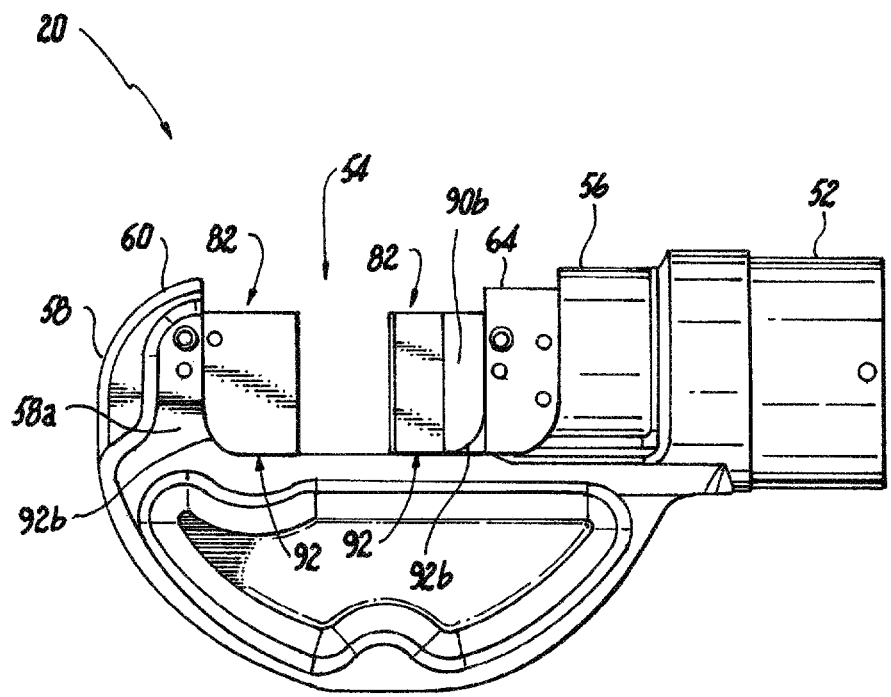
FIG. 17 is a side elevation view of the working head and die set of FIG. 15.
Figure 18:
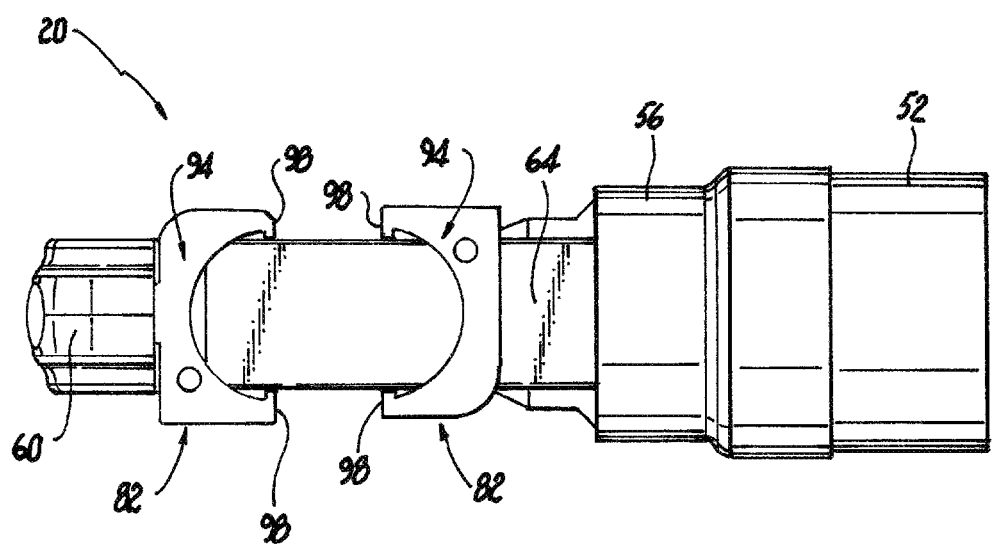
FIG. 18 is a top plan view of the working head and die set of FIG. 15.
Figure 19:
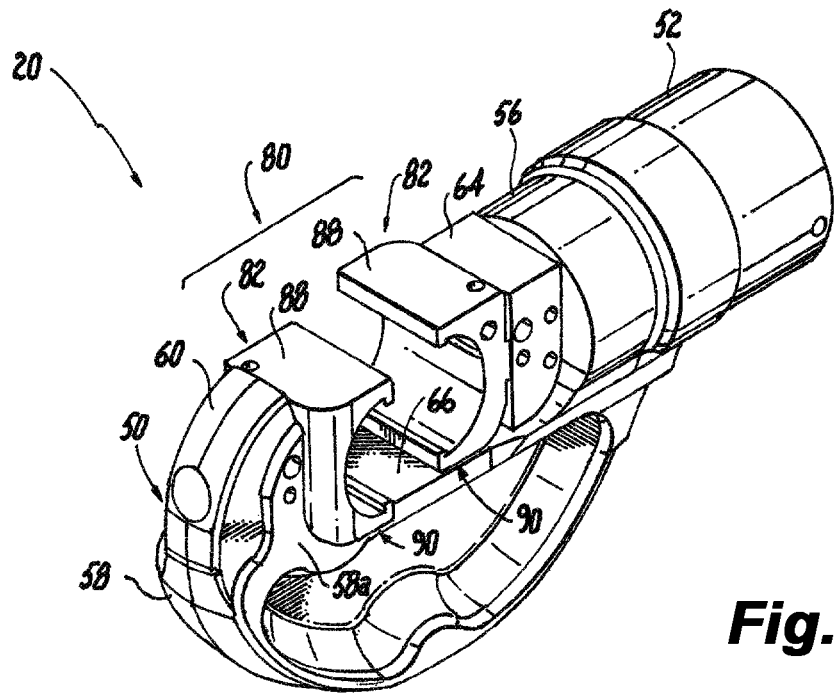
FIG. 19 is a top perspective view of another exemplary embodiment of a working head of a hydraulic crimp tool illustrating the die set according to the present disclosure releasably coupled to the working head in a second crimping orientation.
Figure 20:
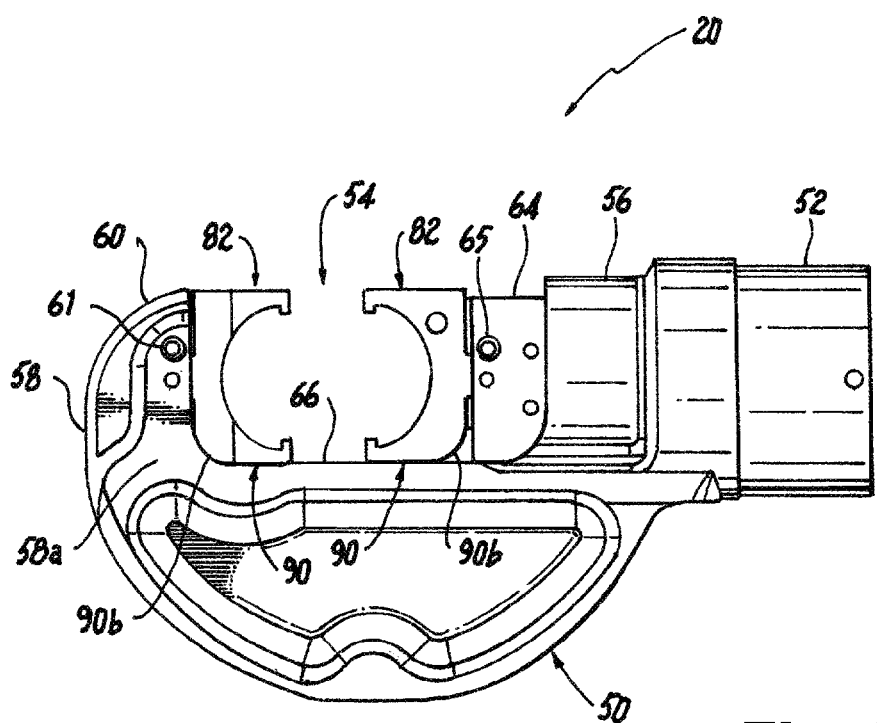
FIG. 20 is a side elevation view of one side of the working head of FIG. 19.

Turning now to FIGS. 15-22, the dies 82 in the die set 80 are configured to be releasably coupled to the die mounts 60 and 64 in two orientations. The first orientation is shown in FIGS. 15-18 where the longitudinal axis "L" of the die, seen in FIG. 5, is perpendicular to the guide track 66 of the head frame 50. The second orientation is shown in FIGS. 19-22 where the longitudinal axis "L" of the die is parallel to the guide track 64 of the head frame 50. In the embodiment of FIGS. 15-18, to couple a die 82 to the first die mount 60, the coupling member 100 of the die 82 is inserted into the orifice 62 of the first die mount 60, seen in FIG. 3, such that the ball-and-detent system engage the annular groove (or detent) 102, seen in FIG. 6, in the coupling member 100. When inserting the coupling member 100 of a die 82 into the orifice 62 of the first die mount 60, the die 82 is oriented so that the side wall 92 is adjacent the guide track 66 and in contact with the guide track 66. In this orientation, the shaped surface 92b of the side wall 92 fits in the shaped edge 58a of the distal end 58 of the head frame 50 as seen in FIG. 17. In addition, with the side wall 92 in contact with the guide track 66 rotation of the die 82 when crimping a wire connector is prevented by the guide track 66. Similarly, when inserting the coupling member 100 of a die 82 into the orifice 63 of the second die mount 64, the die is oriented so that the side wall 92 is adjacent the guide track 66 and in contact with the guide track 66. In this orientation, with the side wall 92 in contact with the guide track 66 rotation of the die 82 when crimping a wire connector is prevented by the guide track 66.

Figure 21:
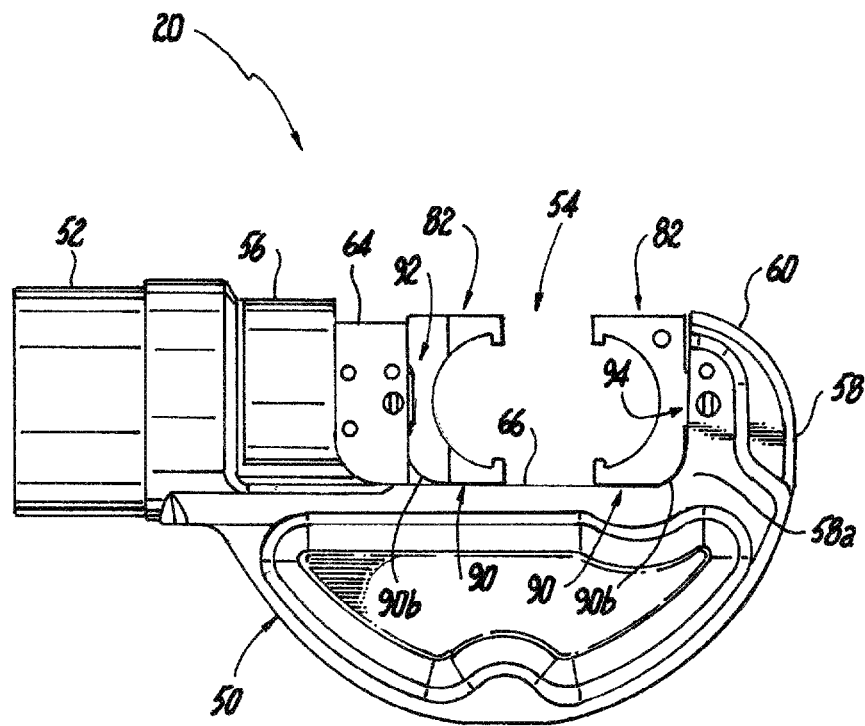
FIG. 21 is a side elevation view of another side of the working head of FIG. 19.
Figure 22:
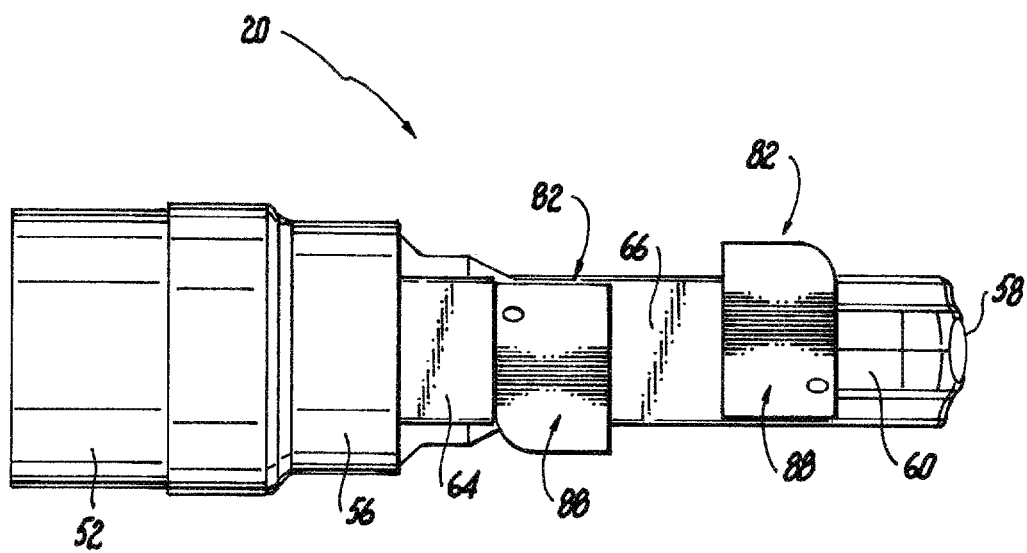
FIG. 22 is a top plan view of the working head and die set of FIG. 19.

In the embodiment of FIGS. 19-22, to couple a die 82 to the first die mount 60, the coupling member 100 of the die 82 is inserted into the orifice 62 of the first die mount 60, seen in FIG. 3, such that the ball-and-detent system engage the annular groove (or detent) 102 in the coupling member 100 to releasably couple the die 82 to the first die mount 60. When inserting the coupling member 100 of a die 82 into the orifice 62 of the first die mount 60, the die 82 is oriented so that the side wall 90 is adjacent the guide track 66 and in contact with the guide track 66. In this orientation, the shaped surface 90b of the side wall 90 fits in the shaped edge 58a of the distal end 58 of the head frame 50, as seen in FIG. 21. In addition, with the side wall 90 in contact with the guide track 66 rotation or angular motion of the die 82 when crimping a wire connector is prevented by the guide track 66. Similarly, when inserting the coupling member 100 of a die 82 into the orifice 63 of the second die mount 64, the die 82 is oriented so that the side wall 90 is adjacent the guide track 66 and in contact with the guide track 66. In this orientation, with the side wall 90 in contact with the guide track 66 rotation or angular motion of the die 82 when crimping a wire connector is prevented by the guide track 66.

When the dies are coupled to their respective die mount 60 and 64, activation of the tool 10 causes the piston coupled to the second die mount 64 to move toward the distal end 58 of the working area 54. This movement causes the die 82 coupled to the second die mount 64 to move from the home or at rest position, seen in FIGS. 17 and 20, toward a crimping position where the moving die impacts a wire connector positioned between the dies 82 in the working area 54 and crimps the wire connector to one or more conductors within the wire connector, which is the crimping position.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A die set with dies that can be repositioned within a working head of a hydraulic crimp tool, each die in the die set comprising:
   a front face having an impacting surface used to crimp wire connectors;
   a rear face having a die coupling member extending therefrom configured to couple the die to a die mount; and
   a plurality of side walls separating the front face from the rear face, wherein a first of the plurality of side walls includes a flat front portion and extending from the front face along the first side wall and a rounded rear portion extending from the flat front portion and transitioning into the rear face, wherein a second of the plurality of side walls includes a flat front portion extending from the front face along the second side wall and a rounded rear portion extending from the flat front portion and transitioning into the rear face, wherein the first side wall is substantially perpendicular to the second side wall, and wherein each die is configured to be rotatably realigned to have selected one of the first side wall and the second side wall abut the working head of the hydraulic crimping tool.

2. The die set according to claim 1, wherein the front face further comprises at least one lip adjacent to the impacting surface.

3. The die set according to claim 1, wherein the impacting surface comprises a semi-circular surface.

4. The die set according to claim 1, wherein the impacting surface comprises a semi-circular surface portion and a notched surface portion at each end of the semi-circular surface portion.

5. The die set according to claim 1, wherein the impacting surface comprises three sides forming a portion of a hexagon.

6. The die set according to claim 1, wherein the impacting surface comprises one of an indentor or a nest.

7. The die set according to claim 1, wherein the die coupling member comprises a cylindrical member having an annular groove forming a detent configured to mate with a ball in the die mount to releasably couple the die to the die mount.

8. The die set according to claim 1, wherein the first side wall is adjacent the second side wall.

9. A hydraulic crimp tool comprising:
   a tool driver; and
   a working head releasably coupled to the tool driver, the working head having a die set where each die in the die set can be repositioned within the working head, each die in the die set comprising:
   a front face having an impacting surface used to crimp wire connectors;
   a rear face having a die coupling member extending therefrom configured to couple the die to a die mount; and
   a plurality of side walls separating the front face from the rear face, wherein a first of the plurality of side walls includes a flat front portion extending from the front face along the first side wall and a rounded rear portion extending from the flat front portion and transitioning into the rear face, wherein a second of the plurality of side walls includes a flat front portion extending from the front face along the second side wall and a rounded rear portion extending from the flat front portion and transitioning into the rear face, wherein the first side wall is substantially perpendicular to the second side wall, and wherein each die is configured to be rotatably realigned to have selected one of the first side wall and the second side wall abut the working head of the hydraulic crimping tool.

10. The tool according to claim 9, wherein the front face further comprises at least one lip adjacent to the impacting surface.

11. The tool according to claim 9, wherein the impacting surface comprises a semi-circular surface.

12. The tool according to claim 9, wherein the impacting surface comprises a semi-circular surface portion and a notched surface portion at each end of the semi-circular surface portion.

13. The tool according to claim 9, wherein the impacting surface comprises three sides forming a portion of a hexagon.

14. The tool according to claim 9, wherein the impacting surface comprises one of an indentor or a nest.

15. The tool according to claim 9, wherein the die coupling member comprises a cylindrical member having an annular groove forming a detent configured to mate with a ball in the die mount to releasably couple the die to the die mount.

16. The tool according to claim 9, wherein the first side wall is adjacent the second side wall.

17. A working head of a hydraulic crimp tool, the working head comprising:
   a head frame configured to be releasably coupled to a tool driver of the tool; and
   a die set where each die in the die set can be repositioned within the head frame, each die in the die set comprising:
   a front face having an impacting surface used to crimp wire connectors;
   a rear face having a die coupling member extending therefrom configured to couple the die to a die mount; and
   a plurality of side walls separating the front face from the rear face, wherein a first of the plurality of side walls includes a flat front portion extending from the front face along the first side wall and a rounded rear portion extending from the flat front portion and transitioning into the rear face, wherein a second of the plurality of side walls includes a flat front portion extending from the front face along the second side wall and a rounded rear portion extending from the flat front portion and transitioning into the rear face, wherein the first side wall is substantially perpendicular to the second side wall, and wherein each die is configured to be rotatably realigned to have selected one of the first side wall and the second side wall abut the working head of the hydraulic crimping tool.

18. The working head according to claim 17, wherein the front face further comprises at least one lip adjacent to the impacting surface.

19. The working head according to claim 17, wherein the impacting surface comprises a semi-circular surface.

20. The working head according to claim 17, wherein the impacting surface comprises a semi-circular surface portion and a notched surface portion at each end of the semi-circular surface portion.

21. The working head according to claim 17, wherein the impacting surface comprises three sides forming a portion of a hexagon.

22. The working head according to claim 17, wherein the impacting surface comprises one of an indentor or a nest.

23. The working head according to claim 17, wherein the die coupler coupling member comprises a cylindrical member having an annular groove forming a detent configured to mate with a ball in the die mount to releasably couple the die to the die mount.

24. The working head according to claim 17, wherein the first side wall is adjacent the second side wall.

\* \* \* \* \*